Feb. 4, 1958 F. HILLSON 2,821,754
PREFABRICATED INSIDE AND/OR OUTSIDE CORNER
INSERT FOR EDGE MOLDING STRIPS
Filed Jan. 14, 1955 3 Sheets-Sheet 1

INVENTOR.
FRANK HILLSON
BY
*Zoltan Holachck*
ATTORNEY

Feb. 4, 1958 F. HILLSON 2,821,754
PREFABRICATED INSIDE AND/OR OUTSIDE CORNER
INSERT FOR EDGE MOLDING STRIPS
Filed Jan. 14, 1955 3 Sheets-Sheet 2
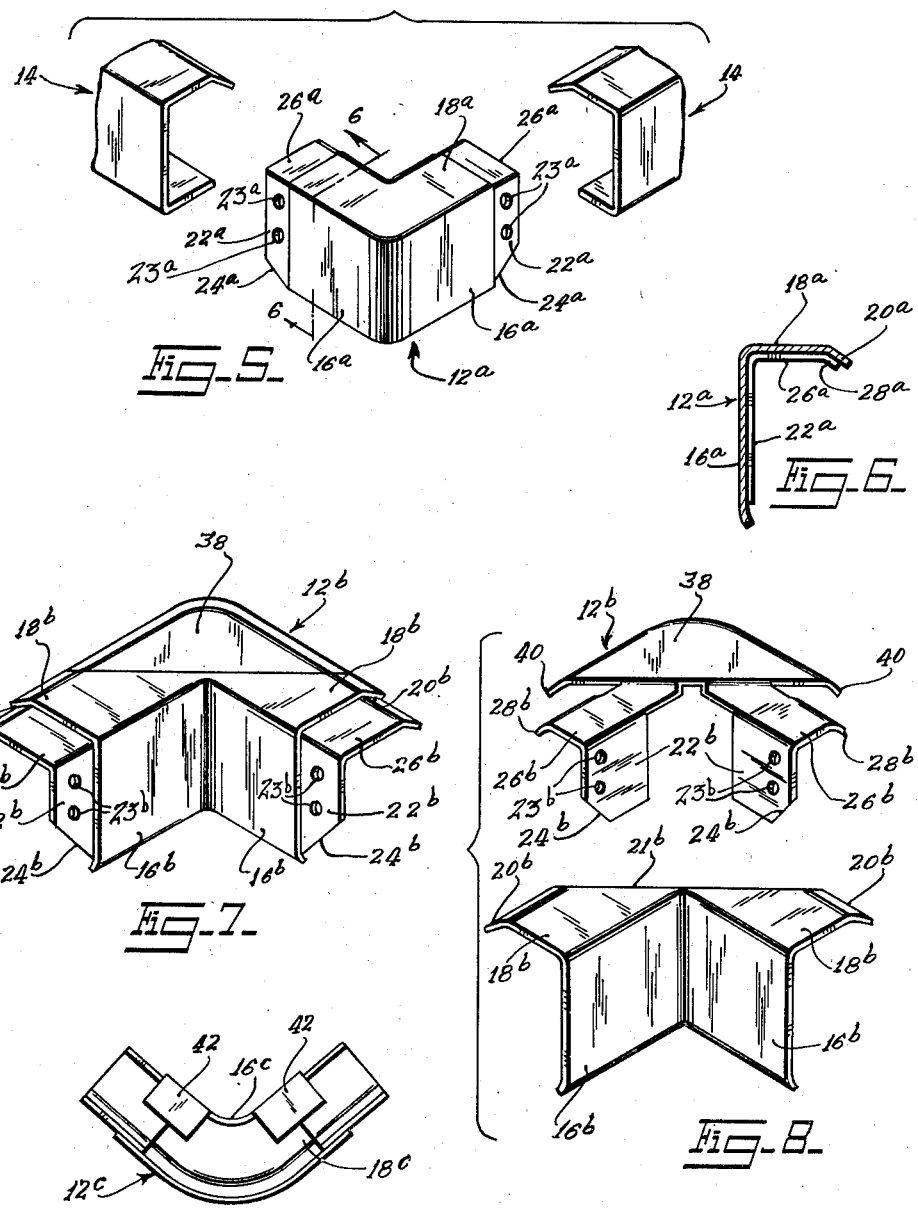
INVENTOR.
FRANK HILLSON
BY
ATTORNEY

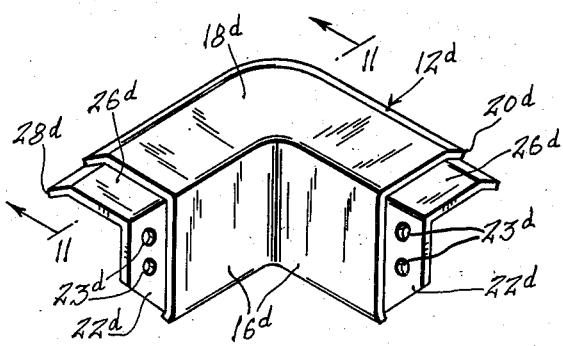
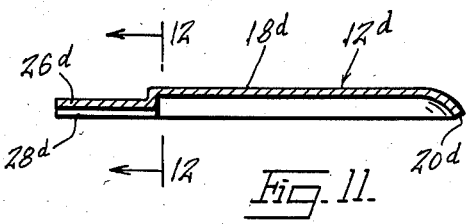
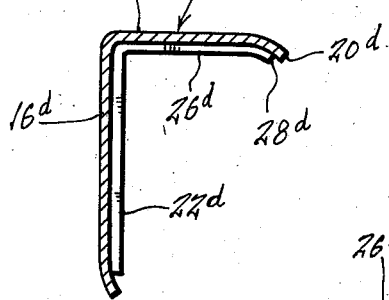
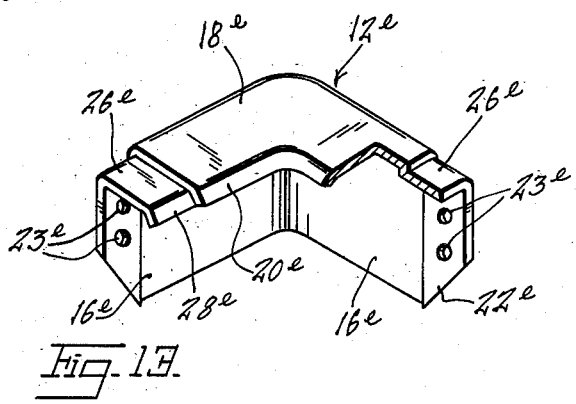

United States Patent Office
2,821,754
Patented Feb. 4, 1958

2,821,754

PREFABRICATED INSIDE AND/OR OUTSIDE CORNER INSERT FOR EDGE MOLDING STRIPS

Frank Hillson, Irvington, N. J.

Application January 14, 1955, Serial No. 481,759

5 Claims. (Cl. 20—74)

This invention relates to a corner insert for molding strips such as those used to trim the edges of table and sink tops, kitchen cabinets, and the like.

It is highly desirable to provide inside and outside corner inserts which will round off the corners to which they are applied to such an extent as to eliminate sharp points, prevent injury, and facilitate the cleaning of the structure on which the trim is used. Continuous efforts are made, by those working regularly at duties involving the application of molding strips to cabinets, tables, or the like, to make outside and inside corners with maximum ease, that have a more rounded or curved shape than those customarily formed in the molding strip.

Apart from the above, it is also worthy of note that the provision of edge trim or molding strips on structures of the type referred to presents some difficulties, in many instances, at the corners of said structures. Particularly is this true of inside corners, since it is difficult to bend molding strips having top and bottom flanges around such corners without the formation of slits or openings in the flanges of the strip. This, of course, is to be avoided, since the strip should be continuous throughout its length, not only to add to the attractiveness of its appearance, but also to eliminate, to a maximum extent, dirt-catching openings or cavities.

Further, while a molding strip of the type stated can be cut to provide a mitered corner when bent around an outside corner, without appreciable difficulty, it is desirable in many instances to provide outside corner inserts. This is true because the provision of inserts at both the inside and outside corners of the cabinet top or other structure adds uniformity to the trim. Further, the use of inserts at the outside corners can permit full utilization of short lengths of molding strips, respectively extending from one corner of the structure to the next corner. Thus, said short lengths, which may have previously been cut from longer strips, need not be discarded, and it becomes unnecessary, when inserts are used both on the inside and outside corners, to extend continuous, elongated molding strips over the full length of the edge being trimmed.

The main object of the present invention is to provide a generally improved insert of the type stated, which can be manufactured at relatively low cost, will be attractive when mounted in place, and will facilitate the application of adjacent lengths of molding thereto.

Still another object is to provide an insert as described which will be so designed as to be held in place by the moldings abutted thereagainst, without the necessity of extending fastening means through the insert itself into the portion of the cabinet structure contacted by the insert.

Still another object is to provide an insert as described which will be so shaped as to insure a strong joint between the insert and the adjacent, abutting moldings, to prevent loosening of the insert.

Another object, in at least one form of the invention, is to provide an improved, sectionally constituted corner insert, adapted to be readily cut and bent to shape from suitable blanks of sheet metal material.

For further comprehension of the invention, and of the objects and advantages thereof, reference will be had to the following description and accompanying drawings, and to the appended claims in which the various novel features of the invention and more particularly set forth.

In the accompanying drawings forming a material part of this disclosure:

Fig. 5 is an exploded perspective view similar to Fig. 2 showing an outside corner insert.

Fig. 6 is a sectional view on line 6—6 of Fig. 5, on an enlarged scale.

Fig. 7 is a perspective view of a modified inside corner insert.

Fig. 8 is an exploded perspective view of the Fig. 7 insert.

Fig. 9 is a bottom plan view of a second modification in an inside corner insert.

Fig. 10 is a perspective view of an inside corner insert showing another modification.

Fig. 11 is an enlarged sectional view on line 11—11 of Fig. 10.

Fig. 12 is a transverse sectional view on line 12—12 of Fig. 11.

Fig. 13 is a perspective view of another modification showing an outside corner insert, a portion being broken away.

Figure 1:
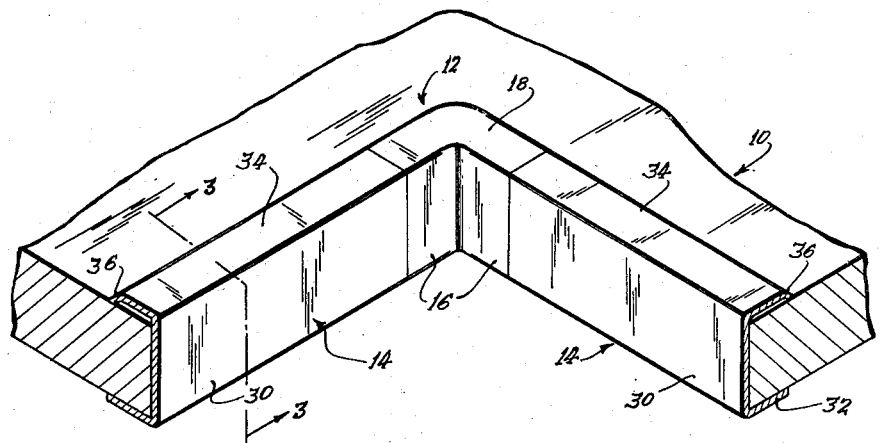
Fig. 1 is a fragmentary perspective view of a table top or the like showing an inside corner thereof to which has been applied a corner insert according to the invention, together with adjacent molding strips.

Referring to the construction shown in Figs. 1–4, a table or cabinet top has been generally designated 10, and applied to an inside corner thereof is an insert 12 according to the invention, against which are abutted adjacent, conventional molding strips 14.

The corner insert 12 is formed with angularly related, integrally connected side walls 16. In the illustrated example, these are disposed in planes at 90° to one another, for mounting on a 90° inside corner of the cabinet top 10. However, it will be understood that the insert walls 16 can be at any desired angle to one another, whether the angle be acute or obtuse, for mounting on correspondingly angled inside corners.

In every instance, regardless of the angle which the walls 16 bear to one another, the cove defined where the walls meet is fully rounded off, to eliminate completely any sharpened portions of the insert, and also to facilitate measurably the cleaning of the insert at the meeting location of the walls 16.

In any event, the walls 16, at their upper ends, are integral with a top flange 18, lying in a horizontal plane.

Since the insert is to be used on an inside corner of the table top, the flange 18 is disposed exteriorly of the included angle defined by the side walls 16, the flange being of right angled or L-shaped formation and being formed, along its outer longitudinal edge, with a downwardly inclined lip 20 engageable against the top surface of the structure 10 to which the insert is being applied.

Figure 3:
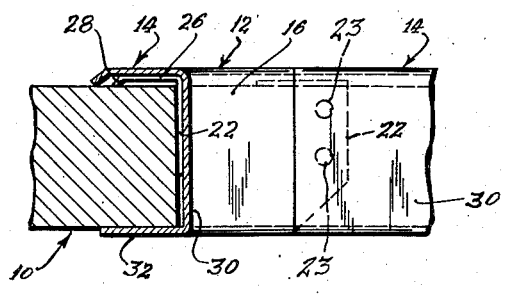
Fig. 3 is an enlarged sectional view on line 3—3 of Fig. 1.
Figure 4:
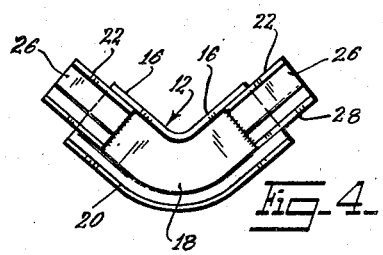
Fig. 4 is a bottom plan view of the insert per se.

Welded or otherwise fixedly secured to the inner surfaces of the side walls 16 are tongue elements 22. Formed in the tongue elements are spaced apertures 23, which can receive nails, in the event the worker desires to nail the prefabricated insert to the plywood base of the structure and then proceed to apply the molding. At their inner ends, the tongue elements are lapped by the walls 16, the outer ends of the tongue elements projecting beyond the outer side edges of the walls. The tongues are partially cut away at their lower, projecting ends as shown at 24, to facilitate the application of the molding strips 14 thereto. Each of the tongues is of substantially inverted L-shaped formation, with a vertical side wall in contact with the adjacent wall 16 of the body portion of the insert. The vertical wall of each tongue element, at its upper end, is formed with an outwardly directed flange 26 contacting the underside of the flange 18. Flange 26 is narrower than flange 18, and at its outer longitudinal edge is formed with a downwardly inclined lip 28 which also engages the table top as shown in Fig. 3. This reinforces the midwidth portion of the flange 18, against being bent inwardly in the direction of the table top.

As will be seen, the tongue elements 22 define, at the opposite ends of the body of the insert, angular recesses adapted to receive the adjacent ends of molding strips 14. The molding strips 14 are of conventional construction, having vertical webs 30 integral at their lower and upper edges with horizontally disposed flanges 32, 34, respectively engageable against the underside and top surface of the table top, the flanges 34 at its outer longitudinal edge having a downwardly inclined lip 36.

Figure 2:
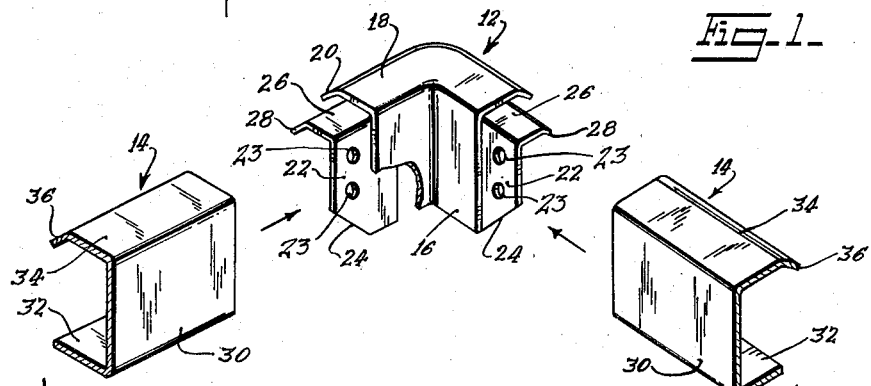
Fig. 2 is an exploded perspective view of the insert and the adjacent strips, portions being broken away.

In use, the molding strips are engaged with the edge of the table top, and are then slidably moved along said edge in the direction of their lengths, as shown by the arrows in Fig. 2, toward the corner insert, which will have previously been mounted upon the inside corner of the tabel top. Ultimately, the longitudinal movement of the molding strips will bring them into abutting relation to the end edges of the flange 18 and walls 16, with the molding strips lapping the projecting portions of the tongues. In the final stage, the parts appear as in Fig. 1 and it will be seen that the tongues are wholly concealed, while a neat joint is made between the inside corner insert and the associated molding strips. The molding strips, of course, will be nailed or otherwise secured in place in their final positions, and by lapping the projecting portions of the tongue element, will hold the corner insert securely in place without the necessity of extension of fastening elements through the insert.

In Figs. 5 and 6 there is shown an outside corner insert 12$^a$, the angularly related, vertical walls 16$^a$ of which are integral with a top flange 18$^a$ having a lip 20$^a$. Since this insert is to be used on an outside corner, the angle defined between the walls 16$^a$ contains the flange 18$^a$, with the lip 20$^a$ being formed on the inside corner of the angular flange 18$^a$.

The tongue elements 22$^a$ are formed identically but oppositely to the tongue elements 22, and have vertical walls 22$^a$ formed with openings 23$^a$, and cut away angularly at their lower ends as at 24$^a$. The walls 22$^a$ are positioned against the inside surfaces of the walls 16$^a$, with the tongue elements projecting outwardly in the same manner as in the first form of the invention. The tongue elements, at their upper ends, have horizontal flanges 26$^a$ terminating in lips 28$^a$, the flanges 26$^a$ being slightly narrower in width than the flanges 18$^a$ as best shown in Fig. 6.

The molding strips, when applied to the insert, lap the projecting portions of the tongues in the same manner as in the first form, and hold the inserts securely in place.

In Figs. 7 and 8 there is shown a modified construction which facilitates the stamping of the insert from sheet metal material. In this form of insert, the insert is sectionally constituted and comprises two parts as shown in the exploded perspective view of Fig. 8. The insert 12$^b$ comprises angularly related vertical walls 16$^b$ integral at their upper ends with horizontally disposed flanges 18$^b$ terminating at their outer longitudinal edges in downwardly inclined lips 20$^b$. The flanges 18$^b$ are cut away along a line 21$^b$ extending diagonally of the walls 16$^b$ and substantially intersecting the angle defined by the wall 16$^b$, at the apex of the angle.

The second part of the insert includes a corner member 38, of approximately isosceles triangular shape, having a base edge engageable against the edge 21$^b$ and coextensive in length with the edge 21$^b$. The corner member 38, along its outer edges, has a continuous, downwardly inclined lip 40 constituting an extension of the lips 20$^b$ when the parts are assembled.

Integral with the face or inside edge of the corner member 38 are tongue elements 22$^b$, these being related to one another at angles coresponding to the angle defined between the walls 16$^b$. The tongue elements 22$^b$ have openings 23$^b$ formed in vertical, depending walls formed upon the outer ends of flanges 26$^b$, said flanges being integral at their inner ends with the inside edge of the corner member 38 and diverging in a direction away from said corner member. The flanges 26$^b$ of the tongue elements are offset downwardly below the main plane of the corner member 38, a distance equal to the thickness of the flanges 18$^b$. Formed upon the outer longitudinal edges of the flanges 26$^b$ are downwardly inclined strips 28$^b$.

The portion of the insert having the walls 16$^b$ is positioned upon the tongue elements 22$^b$, as shown in Fig. 7, after which the tongue elements are welded or otherwise fixedly secured to the walls 16$^b$, while the flanges 26$^b$ are similarly secured to the flanges 18$^b$. This completes the construction of the corner insert, and in its final form, the insert is shaped like and has the functional characteristics of the insert of Fig. 1.

In Fig. 9 there is shown a modification in an inside corner insert designated at 12$^c$. This is similar in every respect to the construction shown in Figs. 1–4, except that on the vertical walls 16$^c$, at the lower edges of said vertical walls, there are integrally formed horizontally disposed lips 42 extending below the top flange 18$^c$ to engage against the underside of the table or cabinet top. This has the desirable result of further securing the corner insert in place, against possible deviation from its assigned position.

In the form of the invention shown in Figs. 10–12, an inside corner insert is shown which is stamped from a single piece of metal, such as stainless steel, brass, or copper. It is important to note that in a commercial embodiment, the construction shown in Figs. 10–12 would in all probability be utilized. The insert is formed with angularly related vertical walls 16$^d$ merging into a rounded inside corner similar to those in the previous forms and integral at their upper edges with a top flange 18$^d$ formed on its outside edge with a downwardly inclined lip 20$^d$. The modified insert 12$^d$ further includes tongue elements 22$^d$ having apertures 23$^d$, said tongue elements being shaped similarly to those in the previous forms of the invention, but being struck downwardly and inwardly out of the single piece of material used in forming the insert, as best shown in Fig. 11. Thus, each tongue element includes a horizontal flange 26$^d$ offset downwardly out of the horizontal plane of the top flange 18$^b$ of the insert body, to an extent equal to the thickness of the molding strip that is to overlie the tongue element in abutting relation to the adjacent end of the flange 18$^b$. Further, the vertical wall of the tongue element is offset inwardly out of the vertical plane of the adjacent wall 16$^d$, to a corresponding extent.

The coining of the device is so carried out that the downwardly inclined lip 28$^d$ of flange 26$^d$ is offset inwardly relative to the lip 20$^d$ (see Fig. 12), to cooperate therewith in providing a proper support of the top portion of the insert upon the associated structure.

In Fig. 13 the one-piece construction is exemplified in an outside corner insert. This includes vertical walls 16$^e$ angularly related to one another, and meeting to provide an outside corner which is fully rounded off in the manner previously described. The walls 16$^e$ are integral with the horizontal top flange 18$^e$ having at its inside edge a depending lip 20$^e$.

In the form shown in Fig 13, the tongue elements are integrally formed upon opposite ends of the insert body, in the same manner as the Figs. 10–12 form. Thus, the tongue elements each include a horizontal top flange $16^e$ offset downwardly out of the plane of an integral with the flange $18^e$. Flange $26^e$ of each tongue element merges into a vertical, depending wall having apertures $23^e$, the wall of the tongue element being offset inwardly out of the vertical plane of the associated main wall $16^e$. The flanges $26^d$ have depending lips $28^e$ extending along their inside edges, and offset inwardly from the lip $20^e$ of flange $18^e$.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A corner insert for molding strips comprising a body portion including angularly related, substantially vertical walls, a substantially horizontal, correspondingly angular top flange on the upper edges of said walls, and tongue elements secured to the respective walls and to the flange and projecting beyond the outer side edges of the walls, for engagement under a pair of molding strips abutted against the flange and said walls, said tongue elements respectively having substantially vertical walls contacting the body portion walls, and horizontally disposed flanges on the upper ends of said tongue element walls underlying the first-named flange, the flanges of the tongue elements being narrower in width than the first-named flange, the first and second named flanges including inclined lips adapted to engage against the surface of an associated structure to which the insert is applied, said lips terminating at their lower edges in a common horizontal plane.

2. A corner insert for molding strips comprising a body portion including angularly related, substantially vertical walls, a substantially horizontal, correspondingly angular top flange on the upper edges of said walls, and tongue elements secured to the respective walls and to the flange and projecting beyond the outer side edges of the walls, for engagement under a pair of molding strips abutted against the flange and said walls, said flange being of sectional formation, said tongue elements being integrally formed upon one section of the flange and the walls being integral with a second section of the flange.

3. A corner insert for molding strips comprising a body portion including angularly related, substantially vertical walls, a substantially horizontal, correspondingly angular top flange on the upper edges of said walls, and tongue elements secured to the respective walls and to the flange and projecting beyond the outer side edges of the walls, for engagement under a pair of molding strips abutted against the flange and said walls, said flange being of sectional formation, said tongue elements being integrally formed upon one section of the flange and the walls being integral with a second section of the flange, the sections of the flange abutting along a line extending diagonally of the flange, said line substantially intersecting with the apex of the angle defined between said walls.

4. A corner insert for molding strips comprising a body portion including angularly related, substantially vertical walls, a substantially horizontal, correspondingly angular top flange on the upper edges of said walls, and tongue elements secured to the respective walls and to the flange and projecting beyond the outer side edges of the walls, for engagement under a pair of molding strips abutted against the flange and said walls, said flange being of sectional formation, said tongue elements being integrally formed upon one section of the flange and the walls being integral with a second section of the flange, the sections of the flange abutting along a line extending diagonally of the flange, said line substantially intersecting with the apex of the angle defined between said walls, the tongue elements including vertical walls adapted to contact the first-named walls and additionally including top flanges on the upper ends of the tongue element walls, said second-named top flanges being integral with the first-named section of the body portion flange, and diverging in a direction outwardly from said first-named section of the body portion flange.

5. A corner insert for molding strips comprising a body portion including angularly related, substantially vertical walls, a substantially horizontal, correspondingly angular top flange on the upper edges of said walls, and tongue elements secured to the respective walls and to the flange and projecting beyond the outer side edges of the walls, for engagement under a pair of molding strips abutted against the flange and said walls, said flange being of sectional formation, said tongue elements being integrally formed upon one section of the flange and the walls being integral with a second section of the flange, the sections of the flange abutting along a line extending diagonally of the flange, said line substantially intersecting with the apex of the angle defined between said walls, the tongue elements including vertical walls adapted to contact the first-named walls and additionally including top flanges on the upper ends of the tongue element walls, said second-named top flanges being integral with the first-named section of the body portion flange, and diverging in a direction outwardly from said first-named section of the body portion flange, the second-named flanges being offset downwardly from the plane of the body portion flange.

References Cited in the file of this patent

UNITED STATES PATENTS

| | | |
|---|---|---|
| 1,250,594 | Knapp | Dec. 18, 1917 |
| 2,094,782 | Doherty | Oct. 5, 1937 |
| 2,150,891 | Tennison | Mar. 14, 1939 |
| 2,281,092 | Andrews et al. | Apr. 28, 1942 |